United States Patent
Moriya et al.

(10) Patent No.: US 10,115,424 B2
(45) Date of Patent: *Oct. 30, 2018

(54) MAGNETIC RECORDING MEDIUM

(71) Applicant: FUJI ELECTRIC CO., LTD., Kawasaki (JP)

(72) Inventors: Tomohiro Moriya, Sendai (JP); Hitoshi Nakata, Sendai (JP); Hiroto Kikuchi, Sendai (JP); Hiroyasu Kataoka, Sendai (JP); Akira Furuta, Sendai (JP); Takehito Shimatsu, Sendai (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 109 days.

This patent is subject to a terminal disclaimer.

(21) Appl. No.: 15/093,956

(22) Filed: Apr. 8, 2016

(65) Prior Publication Data

US 2016/0225394 A1 Aug. 4, 2016

Related U.S. Application Data

(63) Continuation of application No. PCT/JP2015/001426, filed on Mar. 13, 2015.

(30) Foreign Application Priority Data

Apr. 3, 2014 (JP) .................................. 2014-077114
Oct. 24, 2015 (WO) .................. PCT/JP2014/005410

(51) Int. Cl.
*G11B 5/66* (2006.01)
*G11B 5/65* (2006.01)

(52) U.S. Cl.
CPC ................ *G11B 5/653* (2013.01); *G11B 5/65* (2013.01); *G11B 5/66* (2013.01)

(58) Field of Classification Search
CPC .............. G11B 5/66; G11B 5/667; G11B 5/84
See application file for complete search history.

(56) References Cited

U.S. PATENT DOCUMENTS

2003/0162055 A1   8/2003   Lu et al.
2009/0135519 A1   5/2009   Hieda et al.
(Continued)

FOREIGN PATENT DOCUMENTS

JP   2003-313659 A   11/2003
JP   2009-059461 A   3/2009
(Continued)

OTHER PUBLICATIONS

International Search Report of PCT/JP2014/005410 and partial translation thereof.
(Continued)

*Primary Examiner* — Holly C Rickman
(74) *Attorney, Agent, or Firm* — Rabin & Berdo, P.C.

(57) ABSTRACT

The present invention provides a magnetic recording layer that has a high magnetic anisotropy constant Ku and a low Curie temperature Tc, as well as a magnetic recording medium that incorporates such a magnetic recording layer. The magnetic recording medium of the present invention includes a nonmagnetic substrate and a magnetic recording layer containing an ordered alloy. The ordered alloy may contain at least one element selected from the group consisting of Fe and Ni; at least one element selected from the group consisting of Pt, Pd, Au, Rh and Ir; and Ru.

13 Claims, 5 Drawing Sheets

(56) References Cited

U.S. PATENT DOCUMENTS

| | | |
|---|---|---|
| 2010/0110577 A1 | 5/2010 | Weller et al. |
| 2013/0242430 A1 | 9/2013 | Aoyama et al. |
| 2013/0258523 A1 | 10/2013 | Maeda et al. |
| 2014/0272473 A1 | 9/2014 | Chen et al. |
| 2014/0377590 A1 | 12/2014 | Uchida |

FOREIGN PATENT DOCUMENTS

| | | |
|---|---|---|
| JP | 2009-129501 A | 6/2009 |
| JP | 2013-196715 A | 9/2013 |
| JP | 2013-206507 A | 10/2013 |
| WO | WO-2013/140469 A1 | 9/2013 |

OTHER PUBLICATIONS

C. Y. You et al., "Particulate structure of FePt thin films enhanced by Au and Ag alloying", Journal of Applied Physics, vol. 100, 056105, pp. 056105-1-056105-3, 2006.

MAGNETIC RECORDING MEDIUM

CROSS-REFERENCE TO RELATED APPLICATIONS

This non-provisional Application for a U.S. Patent is a Continuation of International Application PCT/JP2015/001426 filed Mar. 13, 2015, which claims priority from JP PA 2014-077114 filed Apr. 3, 2014, and from PCT/JP2014/005110 filed Oct. 24, 2014, the entire contents of all of which are hereby incorporated by reference.

BACKGROUND OF THE INVENTION

1. Field of the Invention

The invention disclosed in the present specification relates to a magnetic recording medium. The invention disclosed in the present specification particularly relates to a magnetic recording medium for use in energy-assisted magnetic recording methods. The invention disclosed in the present specification more particularly relates to a magnetic recording medium for use in thermally-assisted magnetic recording methods.

2. Background of the Related Art

Perpendicular magnetic recording methods are used as a technique for realizing higher magnetic recording densities. A perpendicular magnetic recording medium contains at least a nonmagnetic substrate and a magnetic recording layer formed from a hard magnetic material. A perpendicular magnetic recording medium may also optionally contain, for example, a soft magnetic underlayer that is formed from a soft magnetic material and functions to concentrate, in the magnetic recording layer, the magnetic flux produced by the magnetic head; a seed layer for inducing orientation, in a desired direction, of the hard magnetic material of the magnetic recording layer; and a protective film that protects the surface of the magnetic recording layer.

Reducing the grain size of the magnetic crystal grains in magnetic recording layers has become a pressing requirement in recent years in order to bring about additional improvements in the recording density of perpendicular magnetic recording media. On the other hand, reducing the grain size of magnetic crystal grains causes a reduction in the thermal stability of the written magnetization (signal). As a consequence, in order to compensate for the reduction in thermal stability caused by reducing the grain size of the magnetic crystal grains, the formation is required of magnetic crystal grains using materials that have higher magnetocrystalline anisotropies.

$L1_0$-type ordered alloys have been proposed as materials that have the required high magnetocrystalline anisotropies. WO 2013/140469 (Patent Literature 1) describes an $L1_0$-type ordered alloy containing at least one element selected from the group consisting of Fe, Co, and Ni and at least one element selected from the group consisting of Pt, Pd, Au, and Ir. Representative $L1_0$-type ordered alloys include, for example, FePt, CoPt, FePd, and CoPd.

However, magnetic recording media that have a magnetic recording layer formed of a highly magnetically anisotropic material exhibit a high coercivity and the writing of magnetization (signal) is then made more difficult. Energy-assisted magnetic recording methods, e.g., thermally-assisted recording methods and microwave-assisted recording methods, have been introduced in order to overcome this difficulty in writing. Thermally-assisted recording methods utilize the temperature dependence of the magnetic anisotropy constant (Ku) of magnetic materials, i.e., the characteristic that Ku declines as the temperature increases. These methods use a head that has a heating function for the magnetic recording layer. Thus, by temporarily lowering Ku by raising the temperature of the magnetic recording layer, the reversal magnetic field can be lowered and writing can be carried out at this point. Since Ku returns to its original high value upon cooling, a stable written signal (magnetization) can be maintained. WO 2013/140469 proposes a method that facilitates thermally-assisted magnetic recording by establishing a large temperature gradient in the in-plane direction of the magnetic recording layer during writing.

The use of a thermally-assisted recording method requires that a means of heating the magnetic recording layer be disposed in the magnetic head used for writing. Due, however, to the various requirements imposed by the magnetic head, there are limitations on the heating means that can be used. When this point is considered, the heating temperature of the magnetic recording layer during writing is desirably as low as possible. One index for the heating temperature is the Curie temperature Tc. The Curie temperature Tc of a magnetic material refers to the temperature at which the material loses its magnetism. By lowering the Curie temperature Tc of the material of the magnetic recording layer, the magnetic anisotropy constant Ku at a given temperature is lowered and writing is then made possible at a lower heating temperature.

However, a strong correlation exists between the Curie temperature Tc of a magnetic material and its magnetic anisotropy constant Ku. Materials that have a large magnetic anisotropy constant Ku generally have a high Curie temperature Tc. Due to this, a reduction in the magnetic anisotropy constant Ku and a lowering of the Curie temperature Tc have heretofore been carried out where the priority has been to lower the heating temperature. In relation to this problem, Japanese Patent Application Laid-open No. 2009-059461 (Patent Literature 2) proposes that the correlation between Ku and Tc be relaxed by disposing a plurality of magnetic layers and by establishing a different Ku and Tc for each magnetic layer. Specifically, this literature proposes a magnetic recording layer that comprises a first layer having a first Curie temperature $Tc_1$ and a second layer having a second Curie temperature $Tc_2$ wherein $Tc_1$ is higher than $Tc_2$. By heating this magnetic recording layer to a temperature equal to or greater than $Tc_2$, exchange coupling between the first layer and the second layer is extinguished and writing magnetization to the first layer is made possible.

There have also been efforts to introduce various additional elements into $L1_0$-type ordered alloys with the goal of improving various other properties. For example, Japanese Patent Application Laid-open No. 2003-313659 (Patent Literature 3) proposes a sintered sputtering target that contains the elements constituting an $L1_0$-type ordered alloy and that also contains additional elements and has an oxygen content of not more than 1000 ppm. It is taught that the thin film formed using this target can achieve the ordering of an $L1_0$-type ordered alloy at lower annealing temperatures. In particular, an even greater promotion of the ordering of the $L1_0$-type ordered alloy is brought about when, for example, Cu or Au is added. Japanese Patent Application Laid-open No. 2003-313659 also discloses that isolation of $L1_0$-structured magnetic crystal grains by a nonmagnetic material contributes to improving the magnetic recording density. Nonmagnetic elements and nonmagnetic compounds disposed around the magnetic crystal grains for the purpose of bringing about magnetic isolation between magnetic crystal grains are listed. Various materials containing Ru are taught as examples of such materials.

U.S. Patent Application Publication No. 2003/0162055 (Patent Literature 4), on the other hand, provides a magnetic recording layer formed from a polycrystalline ordered alloy that has the composition $(CoX)_3Pt$ or $(CoX)_3PtY$ and an ordered structure different from that of the $L1_0$ type. Here, the additional element X migrates to the grain boundary and has the effect of promoting magnetic isolation between the magnetic crystal grains. The additional element Y has the effect of facilitating control of the magnetic properties of the polycrystalline ordered alloy, the distribution of the magnetic crystal grains, and the magnetic isolation. US Patent Application Publication No. 2003/0162055 describes various materials that contain Ru as examples of the additional element X.

However, the current situation is that there has been little progress in research on Ru as a material added to ordered alloys. There has been little progress in research on the magnetic characteristics of ordered alloys to which Ru has been added and in particular on the relationship in such ordered alloys between the magnetic anisotropy constant Ku and the Curie temperature Tc.

The objects of the invention disclosed in the present specification are to provide a magnetic recording layer that has a high magnetic anisotropy constant Ku and a low Curie temperature Tc and to provide a magnetic recording medium that has this magnetic recording layer.

SUMMARY OF THE INVENTION

The magnetic recording medium of a first embodiment described in the present specification contains a nonmagnetic substrate and a magnetic recording layer wherein this magnetic recording layer contains an ordered alloy, and the ordered alloy contains at least one element selected from the group consisting of Fe and Ni, and at least one element selected from the group consisting of Pt, Pd, Au, Rh and Ir, and also contains Ru. The ordered alloy here is preferably an $L1_0$-type ordered alloy that contains Fe, Pt, and Ru. In addition, the magnetic recording layer preferably has a granular structure that is provided with magnetic crystal grains containing the ordered alloy and a nonmagnetic grain boundary. The nonmagnetic grain boundary of the granular structure preferably contains at least one material selected from the group consisting of carbon, boron, oxides, carbides, and nitrides.

According to the magnetic recording medium of a second embodiment described in the present specification, the magnetic recording layer in the magnetic recording medium of the first embodiment contains a plurality of magnetic layers and at least one of the plurality of magnetic layers is a magnetic layer that contains the aforementioned ordered alloy. The magnetic recording layer here preferably contains at least one magnetic layer that does not contain the aforementioned ordered alloy. Or, this magnetic recording layer contains at least one layer that has a granular structure provided with magnetic crystal grains and a nonmagnetic grain boundary and the nonmagnetic grain boundary contains at least one material selected from the group consisting of carbon, boron, oxides, carbides, and nitrides. Here, the magnetic crystal grains in at least one magnetic layer that has the granular structure preferably contain the aforementioned ordered alloy. In particular, the magnetic recording medium of this embodiment preferably includes a magnetic recording layer formed of a first magnetic layer and a second magnetic layer formed on the first magnetic layer. The first magnetic layer preferably has a granular structure that is provided with magnetic crystal grains that do not contain the aforementioned ordered alloy and a carbon-containing nonmagnetic grain boundary, and the second magnetic layer preferably has a granular structure that is provided with magnetic crystal grains formed from the aforementioned ordered alloy, and a carbon- and boron-containing nonmagnetic grain boundary. Or, the first magnetic layer preferably has a granular structure that is provided with magnetic crystal grains containing the aforementioned ordered alloy and a carbon-containing nonmagnetic grain boundary and the second magnetic layer preferably has a granular structure that is provided with magnetic crystal grains formed from the aforementioned ordered alloy and a carbon- and boron-containing nonmagnetic grain boundary.

Advantageous Effects of Invention

A magnetic recording medium containing a magnetic recording layer with a high magnetic anisotropy constant Ku, a large anisotropic magnetic field Hk, and a low Curie temperature can be obtained by using the constructions described above. The magnetic recording medium of the invention disclosed in the present specification makes it possible to write at lower heating temperatures in thermally-assisted recording methods. At the same time, the magnetic recording medium of the invention disclosed in the present specification can realize a high heat stability for the written magnetization (signal). Moreover, desired properties, e.g., a large saturation magnetization Ms for the magnetic recording layer as a whole, can be realized by combining the magnetic layer that contains the Ru-containing ordered alloy with a different type of magnetic layer.

DETAILED DESCRIPTION OF INVENTION

Figure 1:
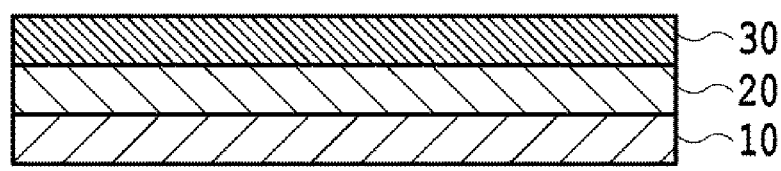
FIG. 1 is a cross-sectional diagram that shows a structural example for the magnetic recording medium of a first embodiment.

The magnetic recording medium of a first embodiment described in the present specification contains a nonmagnetic substrate and a magnetic recording layer, wherein this magnetic recording layer contains an ordered alloy, and the ordered alloy contains at least one first element selected from the group consisting of Fe and Ni, at least one second element selected from the group consisting of Pt, Pd, Au, Rh and Ir, and Ru as a third element. For example, in the structural example shown in FIG. 1, the magnetic recording medium contains a nonmagnetic substrate 10, a magnetic recording layer 30, and a seed layer 20, which may be provided on an optional basis.

The nonmagnetic substrate 10 may be any of various substrates that have a smooth, flat surface. The nonmagnetic substrate 10 can be formed using, for example, those materials generally used in magnetic recording media (NiP-plated Al alloys, toughened glass, glass-ceramics, and so forth), or MgO.

The magnetic recording layer 30 may be a single layer. The single-layer magnetic recording layer 30 contains an ordered alloy that contains at least one first element selected from the group consisting of Fe and Ni, at least one second element selected from the group consisting of Pt, Pd, Au, Rh and Ir, and Ru as a third element. This ordered alloy may be an $L1_0$-type ordered alloy. Preferred $L1_0$-type ordered alloys include FePtRu, FePtRhRu, FePtIrRu, and FePtPdRu. FePtRu is a particularly preferred $L1_0$-type ordered alloy.

A low Tc can be obtained, while retaining a high Ku, by constructing the ordered alloy of the magnetic recording layer 30 with the incorporation of the Ru used as the third element. While the reason for this is still not entirely clear at the present time, the following can be contemplated without intending to be bound by theory.

It is well known that sandwiching a thin coupling layer constituted of a nonmagnetic transition metal, e.g., Ru, Cu, or Cr, between ferromagnetic layers results in anti-ferromagnetic exchange coupling of the adjacent ferromagnetic layers. The anti-ferromagnetic coupling energy varies as a function of, inter alia, the specific elements and the structure of the sandwiching layers. When compared among individual elements, the maximum value of the anti-ferromagnetic exchange coupling energy assumes a large value when Ru is used for the coupling layer and in such a case assumes a value that is at least 10-times that for the use of another element such as Cu. In addition, it is known that Ru can exhibit this effect even at small film thicknesses. Experiments by the present inventors established that the addition of Ru to an ordered alloy such as FePt provides a smaller saturation magnetization Ms at the same Ku than for the addition of other elements, e.g., Cu. When these points are comprehensively considered, it is hypothesized that a phenomenon analogous to anti-ferromagnetic coupling, which produces couples with opposite spin directions, is produced via the added Ru. It is thought that the production of anti-ferromagnetic coupling in this way in a portion of the interior of the ordered alloy via the Ru used as a third element facilitates the generation of spin disorder for the entire body at relatively low temperatures and thus brings about a lowering of Tc.

The present inventors also discovered an unexpected effect, i.e., a magnetic recording layer 30 formed of an Ru-containing ordered alloy exhibits a smaller decline in the anisotropic magnetic field Hk than for the use of ordered alloys that contain a different element. It is believed in the technical field of magnetic materials that the addition of a hetero-element to an ordered alloy causes other properties to decline, such as the anisotropic magnetic field Hk, at the same time that a reduction in the ordering temperature is brought about. With Ru, however, even when its amount of addition is increased, the anisotropic magnetic field Hk is maintained at at least 80% of that in the absence of Ru addition. On the contrary, a unique effect, which runs counter to conventional knowledge, was observed, i.e., in the region of small amounts of Ru addition the anisotropic magnetic field Hk was increased over that in the absence of addition.

The ratio of the first element to the second element in the ordered alloy used in the present embodiment, expressed on the basis of the number of atoms, may be in the range from 0.7 to 1.3 and is preferably in the range from 0.9 to 1.1. An $L1_0$-type ordered structure having a large magnetic anisotropy constant Ku can be obtained by using a composition ratio in the indicated range. In addition, the content in the ordered alloy used in the present embodiment of the Ru third element, expressed with reference to the ordered alloy as a whole, can be in the range from 0.5 to 20 atom % (at %) and is preferably in the range from 1 to 15 at %. The use of Ru at a content in the indicated range makes it possible to bring about a reduction in the Curie temperature Tc while maintaining a large magnetic anisotropy constant Ku. A single fourth element or a plurality of fourth elements may also be introduced into the ordered alloy used in the present embodiment. Various elements may be used as this fourth element on the condition that the effects from the Ru are not impaired. Non-limiting examples of the fourth element include Ag, Cu, Co, Mn, Cr, Ti, Zr, Hf, Nb, Ts, Al, and Si.

All of the atoms in the ordered alloy need not have an ordered structure in the present embodiment. Ordered alloys having an order S, which represents the extent of the ordered structure, of equal to or greater than a prescribed value can be used as the ordered alloy of the present embodiment. The order S is measured by XRD on the magnetic recording medium and is calculated from the ratio between the measured value and the theoretical value for the case of complete ordering. For an $L1_0$-type ordered alloy, the calculation is performed using the integrated intensities for the (001) and (002) peaks originating from the ordered alloy. The order S can be obtained as a square root of a quotient of the measured value for the ratio of the (001) peak integrated intensity to the (002) peak integrated intensity divided by the theoretically calculated ratio of the (001) peak integrated intensity to the (002) peak integrated intensity for the case of complete ordering. A magnetic anisotropy constant Ku practicable for a magnetic recording medium is obtained when the thusly obtained order S is equal to or greater than 0.5.

Or, the single-layer magnetic recording layer 30 may have a granular structure constituted of magnetic crystal grains constituted of the aforementioned ordered alloy and a nonmagnetic grain boundary that surrounds the magnetic crystal grains. The material constituting the nonmagnetic grain boundary includes carbon, boron, carbides, oxides, and nitrides. Oxides usable for the nonmagnetic grain boundary include $SiO_2$, $TiO_2$, and ZnO. Nitrides usable for the nonmagnetic grain boundary include SiN and TiN. Or, the nonmagnetic grain boundary may also be formed using two or more materials, such as a mixture of boron (B) and carbon (C). The individual magnetic crystal grains in the granular structure are magnetically isolated by the nonmagnetic grain boundary. This magnetic isolation is effective for improving the SNR of the magnetic recording medium.

The magnetic recording layer 30 is preferably formed by a sputtering method accompanied by heating of the substrate. The substrate temperature during formation of the magnetic recording layer 30 is preferably in the range from 300 to 800° C. A substrate temperature in the range from 400 to 500° C. is particularly preferred. The order S of the $L1_0$-type ordered alloy material in the magnetic recording layer 30 can be improved by using a substrate temperature in the indicated range. Or, a sputtering method may be used that uses two targets, i.e., a target composed of the first element and the second element and a target composed of the third element. Or, a sputtering method may be used that uses three targets, i.e., a target composed of the first element, a target composed of the second element, and a target composed of the third element. In these cases, the proportions of the first element, second element, and third element in the ordered alloy of the magnetic recording layer 30 can be controlled by individual power feeds to the individual targets.

The formation of the granular magnetic recording layer 30 may be carried out using a target in which the material that will form the magnetic crystal grains is mixed in a prescribed proportion with the material that will form the nonmagnetic grain boundary. Alternately, a target composed of the material that will form the magnetic crystal grains and a target composed of the material that will form the nonmagnetic grain boundary may be used. As described above, a plurality of targets may be used as the target for forming the magnetic crystal grains. In this case, the proportions in the magnetic recording layer 30 between the magnetic crystal grains and the nonmagnetic grain boundary can be controlled by individual power feeds to the individual targets.

The magnetic recording medium of a second embodiment described in the present specification differs from the magnetic recording medium of the first embodiment in that the magnetic recording layer in the second embodiment is composed of a plurality of magnetic layers. In this embodiment, at least one of the plurality of magnetic layers contains the aforementioned ordered alloy that contains Ru as a third element. In this specification, a magnetic layer containing the ordered alloy described for the first embodiment is designated as a "magnetic layer A". A magnetic layer A may have a non-granular structure or may have a granular structure. When the magnetic recording layer contains a plurality of magnetic layers A, each of these magnetic layers A may independently have a granular structure or a non-granular structure. A magnetic layer A desirably has a granular structure.

The magnetic recording layer of this embodiment may contain at least one magnetic layer that does not contain the aforementioned ordered alloy. Stated differently, at least one of the plurality of magnetic layers other than a magnetic layer A may lack the aforementioned ordered alloy. A magnetic layer that lacks the aforementioned ordered alloy is designated as a "magnetic layer B" in the present embodiment. A magnetic layer B may have a non-granular structure or may have a granular structure. When the magnetic layer contains a plurality of magnetic layers B, each of these magnetic layers B may independently have either a granular structure or a non-granular structure. A magnetic layer B may contain, for example, an ordered alloy that has at least one first element selected from the group consisting of Fe, Co, and Ni and at least one second element selected from the group consisting of Pt, Pd, Au, Rh and Ir. In other words, the magnetic layer B may be a layer that does not contain an ordered alloy that has Ru. The ordered alloy may be an $L1_0$-type ordered alloy. Preferred $L1_0$-type alloys include FePt, CoPt, FePd, and CoPd. FePt is a particularly preferred $L1_0$-type alloy.

For example, the magnetic layer B may be a layer for the purpose of Tc control that has a Curie temperature Tc different from that of the magnetic layer A. A magnetic layer B for the purpose of Tc control desirably has a granular structure. The magnetic crystal grains in the granular magnetic layer B can be formed, for example, of a magnetic material that at least contains either Co or Fe. In addition, this magnetic material preferably additionally contains at least any one of Pt, Pd, Ni, Mn, Cr, Cu, Ag, and Au. For example, a magnetic layer B for the purpose of Tc control can be formed using a CoCr-based alloy, CoCrPt-based alloy, FePt-based alloy, or FePd-based alloy. The crystalline structure of the magnetic material can be, for example, an hcp structure, fcc structure, or an ordered structure such as, for example, an $L1_0$ type, $L1_1$ type, or $L1_2$ type. The nonmagnetic grain boundary may contain carbon, boron, an oxide selected from the group consisting of $SiO_2$, $TiO_2$, and ZnO, or a nitride selected from the group consisting of SiN and TiN.

Alternately, the magnetic layer B may be a cap layer. A cap layer may be a continuous magnetic layer among the magnetic layers. The magnetic reversal of the magnetic recording medium can be adjusted by the insertion of this continuous magnetic layer. The material constituting the continuous magnetic layer is preferably a material that at least contains either Co or Fe and that preferably additionally contains at least any one of Pt, Pd, Ni, Mn, Cr, Cu, Ag, Au, and rare earth elements. For example, a CoCr-based alloy, CoCrPt-based alloy, FePt-based alloy, FePd-based alloy, or CoSm-based alloy can be used. The continuous magnetic layer may be either polycrystalline or amorphous. In the case of a polycrystalline configuration, the crystalline structure can be, for example, an hcp structure (hexagonal close-packed structure), an fcc structure (face-centered cubic structure), or an ordered structure such as, for example, an $L1_0$ type, $L1_1$ type, or $L1_2$ type.

In order to adjust the magnetic exchange coupling between two magnetic layers, an exchange coupling control layer may be disposed between the magnetic layers in the magnetic recording layer of the present embodiment. The reversal magnetic field can be adjusted by adjusting the magnetic exchange coupling at the writing temperature. The exchange coupling control layer may be either a magnetic layer or a nonmagnetic layer in correspondence to the desired exchange coupling. A nonmagnetic layer is preferably used for enhancing the reduction in the reversal magnetic field at the writing temperature.

The magnetic layer B functions in cooperation with the magnetic layer A to maintain the magnetization, at the signal maintenance temperature, that corresponds to the data (for example, 0 and 1 data) intended to be written, and/or functions in cooperation with the magnetic layer A to facilitate writing at the write temperature. To support these objectives, another magnetic layer can be inserted in place of the previously described cap layer or magnetic layer for the purpose of Tc control or in addition to the cap layer and magnetic layer for the purpose of Tc control. The following, for example, may be inserted: a magnetic layer that controls magnetic properties; a magnetic layer that controls the ferromagnetic resonance frequency for microwave-assisted magnetic recording. The magnetic properties to be controlled here include, for example, the magnetic anisotropy constant (Ku), the reversal magnetic field, the coercivity Hc, and the saturation magnetization Ms. The inserted magnetic layer may be a single layer or may have a structure in which different layers, e.g., that have different compositions, are stacked. In addition, a plurality of magnetic layers having different compositions may be inserted.

At least one of the plurality of magnetic layers in the magnetic recording layer of this embodiment desirably has a granular structure. This granular layer may be a magnetic layer A or may be a magnetic layer B. When two granular magnetic layers are present adjacent to one another, the materials forming the nonmagnetic grain boundaries in these magnetic layers desirably are different. The formation of the nonmagnetic grain boundaries in adjacent magnetic layers using different materials makes it possible to promote columnar growth of the magnetic crystal grains in the magnetic layers and bring about an enhanced order for the ordered alloy and an enhanced magnetic isolation for the magnetic crystal grains.

Within the plurality of magnetic layers that constitute the magnetic recording layer of this embodiment, an ordered alloy-free layer may be formed using any method known in this art, e.g., sputtering methods (including, for example, DC magnetron sputtering methods), vacuum vapor deposition methods, and so forth. A sputtering method that uses a target in which the material that will form the magnetic crystal grains and the material that will form the nonmagnetic grain boundary are mixed in prescribed proportions, as described for the first embodiment, may be used to form a granular layer that does not contain an ordered alloy. Or, a granular layer may be formed by a sputtering method that uses a target composed of the material that will form the magnetic crystal grains and a target composed of the material that will form the nonmagnetic grain boundary. With regard, on the other hand, to the ordered alloy-containing layer within the plurality of magnetic layers, the ordered alloy-containing layer is preferably formed, as described for the first embodiment, by a sputtering method accompanied by heating of the substrate.

In a structural example of the magnetic recording medium according to the second embodiment described in the present specification, the magnetic recording layer is formed of a first magnetic layer and a second magnetic layer. The second magnetic layer is formed on the first magnetic layer. For example, in the structural example shown in FIG. 2, the magnetic recording medium contains a nonmagnetic substrate 10, a magnetic recording layer 30 formed of a first magnetic layer 31 and a second magnetic layer 32, and a protective layer 40, which is provided on an optional basis.

The first magnetic layer 31 has a granular structure that is provided with magnetic crystal grains and a nonmagnetic grain boundary. The magnetic crystal grains of the first magnetic layer 31 do not contain the Ru-containing ordered alloy described for the first embodiment. Specifically, the magnetic crystal grains of the first magnetic layer 31 are formed from an ordered alloy composed of at least one first element selected from the group consisting of Fe, Co, and Ni and at least one second element selected from the group consisting of Pt, Pd, Au, Rh and Ir. The ordered alloy may be an $L1_0$-type ordered alloy. Preferred $L1_0$-type ordered alloys include FePt, CoPt, FePd, and CoPd. FePt is a particularly preferred $L1_0$-type ordered alloy.

In addition, the nonmagnetic grain boundary of the first magnetic layer 31 contains carbon. The nonmagnetic grain boundary in the first magnetic layer 31 is preferably formed from carbon. When the aforementioned ordered alloy is used, carbon, being a substance with an excellent diffusivity, migrates from the magnetic crystal grain position to the nonmagnetic area more rapidly than does, for example, an oxide or nitride. As a result, the magnetic crystal grain is well separated from the carbon and the order of the ordered alloy constituting the magnetic crystal grain is enhanced. Homogeneous magnetic crystal grains are also readily formed.

The first magnetic layer 31 has a film thickness desirably of 0.5 to 4 nm and preferably 1 to 2 nm. The use of a film thickness in this range makes it possible to achieve both an enhanced order for the magnetic crystal grains and an enhanced magnetic isolation. In addition, the first magnetic layer 31 desirably has a film thickness in the indicated range because this also inhibits the diffusion of carbon to the top surface of the magnetic crystal grains.

The second magnetic layer 32 has a granular structure that is provided with magnetic crystal grains and a nonmagnetic grain boundary. The magnetic crystal grains in the second magnetic layer 32 is formed from the ordered alloy described for the first embodiment. Specifically, the ordered alloy contains an ordered alloy that contains at least one first element selected from the group consisting of Fe and Ni, at least one second element selected from the group consisting of Pt, Pd, Au, Rh and Ir, and Ru as a third element. The ordered alloy may be an $L1_0$-type ordered alloy. Preferred $L1_0$-type ordered alloys include FePtRu, FePtRhRu, FePtIrRu, and FePtPdRu. A particularly preferred $L1_0$-type ordered alloy is FePtRu.

The nonmagnetic grain boundary of the second magnetic layer 32 contains a carbon and boron mixture or $SiO_2$. The nonmagnetic grain boundary in the second magnetic layer 32 is preferably formed from a carbon and boron mixture or $SiO_2$. Thus, the nonmagnetic grain boundary of the second magnetic layer 32 is formed from a material that is different from that of the nonmagnetic grain boundary of the first magnetic layer 31. The formation of the nonmagnetic grain boundaries of the first magnetic layer 31 and the second magnetic layer 32 from different materials makes it possible to bring about columnar growth of the magnetic crystal grains of the second magnetic layer 32 on the magnetic crystal grains of the first magnetic layer 31. Magnetic crystal grains that penetrate through the film thicknesses of the first magnetic layer 31 and the second magnetic layer 32 are formed through the formation of the magnetic crystal grains of the second magnetic layer 32 on the magnetic crystal grains of the first magnetic layer 31. The formation of such magnetic crystal grains lowers the exchange interaction between adjacent magnetic crystal grains. This effect makes it possible to carry out high density magnetic recording on the magnetic recording medium.

The second magnetic layer 32 desirably has a film thickness of 0.5 to 10 nm and preferably 3 to 7 nm. An enhanced order for the magnetic crystal grains can be achieved by using a film thickness in this range. In addition, by using a film thickness in this range, the formation of giant magnetic grains by the coalescence of the magnetic crystal grains of the second magnetic layer 32 can be inhibited and the magnetic isolation of the magnetic crystal grains of the second magnetic layer 32 can be enhanced.

The magnetic recording medium described in the present specification may additionally contain, between the nonmagnetic substrate 10 and the magnetic recording layer 30, one layer or a plurality of layers selected from the group consisting of an adhesion layer, a heat sink layer, a soft magnetic underlayer, an underlayer, and a seed layer 20. In addition, the magnetic recording medium described in the present specification may additionally contain a protective layer 40 on the magnetic recording layer 30. The magnetic recording medium described in the present specification may also contain a liquid lubricant layer on the magnetic recording layer 30 or the protective layer 40.

The adhesion layer, which is provided on an optional basis, is used in order to increase the adhesion between the layer formed thereon and the layer (including the nonmagnetic substrate 10) formed there under. In instances in which an adhesive layer is disposed on the upper side of the nonmagnetic substrate 10, the adhesive layer can be formed using a material that exhibits a good adhesion with the material of the previously described nonmagnetic substrate 10. Such a material includes metals such as Ni, W, Ta, Cr, and Ru and alloys that contain these metals. Or, the adhesive layer may be formed between two constituent layers that do not include the nonmagnetic substrate 10. The adhesive layer may be a single layer or may have a stacked structure of a plurality of layers.

The soft magnetic underlayer, which is provided on an optional basis, controls the flux from the magnetic head and thereby enhances the read-write characteristics of the magnetic recording medium. Materials for forming the soft magnetic underlayer include crystalline materials such as NiFe alloys, sendust (FeSiAl) alloys, and CoFe alloys; microcrystalline materials such as FeTaC, CoFeNi, and CoNiP; and amorphous materials including Co alloys such as CoZrNb and CoTaZr. The optimal value for the film thickness of the soft magnetic underlayer depends on the structure and properties of the magnetic head used for the magnetic recording. When the soft magnetic underlayer is formed by continuous film deposition with another layer, the soft magnetic underlayer preferably has a film thickness in the range from 10 nm to 500 nm (inclusive of both limits) considering the balance with the productivity.

A heat sink layer may be provided when the magnetic recording medium described in the present specification is to be used in a thermally-assisted magnetic recording method. The heat sink layer is a layer for effectively absorbing from the magnetic recording layer 30 excess heat that is produced during thermally-assisted magnetic writing. The heat sink layer can be formed using materials that have a high thermal conductivity and a high specific heat capacity. Such materials include Cu as such, Ag as such, Au as such, and alloys in which these are the major component. Here, "major component" indicates that the content of the indicated material is at least 30 weight %. Viewed from the perspective of, for example, the strength, the heat sink layer can be formed using, for example, an Al—Si alloy or a Cu—B alloy. Moreover, the use, for example, of a sendust (FeSiAl) alloy or a soft magnetic CoFe alloy to form the heat sink layer can also provide the heat sink layer with the functionality of a soft magnetic underlayer (the function of concentrating the perpendicular magnetic field produced by the head in the magnetic recording layer 30). The optimal value of the film thickness of the heat sink layer will vary as a function of the amount of heat and the heat distribution during the thermally-assisted magnetic write, the layer structure of the magnetic recording medium, and the thickness of the individual constituent layers. In the case, for example, of formation by continuous deposition with another constituent layer, a film thickness for the heat sink layer of from at least 10 nm to not more than 100 nm is preferred considering the balance with the productivity. The heat sink layer may be formed using any method known in this art, e.g., sputtering methods (including, for example, DC magnetron sputtering methods), vacuum vapor deposition methods, and so forth. The heat sink layer is formed using a sputtering method in the usual case. Considering the properties required in a magnetic recording medium, the heat sink layer can be disposed, for example, between the nonmagnetic substrate 10 and an adhesive layer or between an adhesive layer and an underlayer.

An underlayer is a layer for controlling the crystallinity and/or the crystal orientation of a seed layer 20 formed there over. The underlayer may be a single layer or may be a plurality of layers. The underlayer is preferably Cr metal or a nonmagnetic film formed from an alloy provided by the addition of at least one metal selected from the group consisting of Mo, W, Ti, V, Mn, Ta, and Zr to Cr, which is used as the major component. The underlayer can be formed using any method known in this art, for example, by a sputtering method.

The seed layer 20 functions to secure adhesion between the layer there under, e.g., an underlayer, and the magnetic recording layer 30 and also functions to control the grain size and crystal orientation of the magnetic crystal grains in the magnetic recording layer 30 that is the overlying layer. The seed layer 20 is preferably nonmagnetic. In addition, when the magnetic recording medium described in the present specification is used in a thermally-assisted magnetic recording method, the seed layer 20 preferably also functions as a heat barrier to control the temperature ramp up and temperature distribution of the magnetic recording layer 30. In order to control the temperature ramp up and temperature distribution of the magnetic recording layer 30, the following functionalities are preferably present in good balance in the seed layer 20: a functionality that supports a rapid ramp up of the temperature of the magnetic recording layer 30 when the magnetic recording layer 30 is heated during thermally-assisted writing, and a functionality whereby heat in the magnetic recording layer 30 is conducted to an underlying layer, e.g., an underlayer, by heat transfer in the depth direction before the occurrence of heat transfer in the in-plane direction of the magnetic recording layer 30.

In order to achieve these functionalities, the material of the seed layer 20 is selected as appropriate in combination with the material of the magnetic recording layer 30. More specifically, the material of the seed layer 20 is selected in combination with the material of the magnetic crystal grains of the magnetic recording layer. For example, when the magnetic crystal grains of the magnetic recording layer 30 are formed from an $L1_0$-type ordered alloy, the seed layer is preferably formed using Pt metal or an NaCl-type compound. The seed layer 20 is particularly preferably formed using an oxide such as MgO or $SrTiO_3$ or a nitride such as TiN. The seed layer 20 may also be formed by stacking a plurality of layers formed from these materials. Viewed from the standpoints of improving the crystallinity of the magnetic crystal grains of the magnetic recording layer 30 and improving the productivity, the seed layer 20 preferably has a film thickness of 1 nm to 60 nm and more preferably 1 nm to 20 nm. The seed layer 20 may be formed using any method known in this art, e.g., sputtering methods (including, for example, RF magnetron sputtering methods, DC magnetron sputtering methods), vacuum vapor deposition methods, and so forth.

The protective layer 40 can be formed using those materials that are conventionally used in the field of magnetic recording media. Specifically, the protective layer 40 can be formed using a nonmagnetic metal such as Pt, a carbon-based material such as diamond-like carbon, or a silicon-based material such as silicon nitride. The protective layer 40 may be a single layer or may have a stacked structure. A protective layer 40 with a stacked structure may be, for example, a stacked structure of two carbon-based materials that have different properties, a stacked structure of a metal and a carbon-based material, or a stacked structure of a metal oxide film and a carbon-based material. The protective layer 40 may be formed using any method known in this art, e.g., sputtering methods (including, for example, DC magnetron sputtering methods), CVD methods, vacuum vapor deposition methods, and so forth.

The liquid lubricant layer can be formed using those materials that are conventionally used in the field of magnetic recording media (for example, perfluoropolyetherbased lubricants). The liquid lubricant layer can be formed using, for example, a coating method such as a dip coating method, spin coating method, and so forth.

EXAMPLES

Example 1

A nonmagnetic substrate 10 was prepared by cleaning a (001) MgO single-crystal substrate that had a smooth, flat surface. After cleaning, the nonmagnetic substrate 10 was introduced into a sputtering apparatus. After the nonmagnetic substrate 10 had been heated to 350° C., a Pt seed layer 20 with a film thickness of 20 nm was formed by RF magnetron sputtering in Ar gas at a pressure of 0.44 Pa using a Pt target.

The nonmagnetic substrate 10 bearing the seed layer 20 was then heated to 350° C. and an FePtRu magnetic recording layer 30 with a film thickness of 10 nm was formed by RF magnetron sputtering in Ar gas at a pressure of 0.60 Pa using an FePt target and an Ru target, thus yielding a magnetic recording medium having the structure shown in FIG. 1. The Fe and Pt contents in the magnetic recording layer were adjusted using a target with an Fe/Pt ratio of 1.1, a target with an Fe/Pt ratio of 1.0, and a target with an Fe/Pt ratio of 0.8 for the FePt target. In addition, the Ru content in the magnetic recording layer 30 was adjusted by fixing the power applied to the FePt target at 300 W and varying the power applied to the Ru target from 0 to 240 W. The compositions of the obtained magnetic recording layers 30 are given in Table 1.

The saturation magnetization Ms of the obtained magnetic recording media was measured using a vibrating sample magnetometer (VSM). In addition, the obtained magnetic recording media were heated from room temperature (25° C.) to 400° C. and the saturation magnetization Ms at each temperature was measured using a vibrating sample magnetometer (VSM). The measurement temperature and the square of the magnetic saturation ($Ms^2$) were plotted and the regression line was obtained by the least squares method. The obtained regression line was extrapolated to the point $Ms^2=0$ to determine the Curie temperature Tc. The magnetic anisotropy constant Ku of the obtained magnetic recording layer 30 was determined using the anomalous Hall effect. Specifically, the magnetic torque curve was measured in a 7 T external magnetic field at room temperature (25° C.) and the magnetic anisotropy constant Ku was determined by fitting the obtained torque curve. In addition, the anisotropic magnetic field Hk was determined using the equation $Hk=2\times Ku/Ms$ from the values of the magnetic anisotropy constant Ku and saturation magnetization Ms at room temperature obtained as described above. In this Description, the "normalized anisotropic magnetic field" and the "normalized Hk" refer to Hk values that have been normalized by the Hk of the magnetic recording medium that does not contain the third element while having the same Fe/Pt ratio. The obtained evaluation results are given in Table 1.

Comparative Example 1

Magnetic recording media were obtained by repeating the procedure in Example 1, but in this case using a Cu target in place of the Ru target and using FePt targets with different Fe/Pt ratios (approximately 0.7, approximately 0.9 and approximately 1.2). The magnetic recording layer compositions and the results of the evaluations for the obtained magnetic recording media are given in Table 2. The normalized Hk was not evaluated for samples C9 to C13 because the magnetic recording media having a magnetic recording layer formed from FePt ordered alloy having the same Fe/Pt ratio were not prepared.

Comparative Example 2

Magnetic recording media were obtained by repeating the procedure in Example 1, but in this case using a V target in place of the Ru target and using FePt targets that had different Fe/Pt ratios (approximately 1.0 and approximately 1.1). The magnetic recording layer compositions and the results of the evaluations for the obtained magnetic recording media are given in Table 3.

Comparative Example 3

Magnetic recording media were obtained by repeating the procedure in Example 1, but in this case using an Mn target in place of the Ru target and using FePt targets that had different Fe/Pt ratios (approximately 1.0, approximately 1.1, and approximately 1.2). The magnetic recording layer compositions and the results of the evaluations for the obtained magnetic recording media are given in Table 4.

TABLE 1

| sample | composition proportions (at %) | | | Ms[*1] (emu/cc) | Ku[*2] (×10$^7$ erg/cc) | Tc (° C.) | Hk[*3] (kOe) | normalized Hk |
|---|---|---|---|---|---|---|---|---|
| | Fe | Pt | Ru | | | | | |
| Table 1: compositions and evaluation results for the FePtRu magnetic recording layers of Example 1 (Fe/Pt = approximately 1.0) | | | | | | | | |
| 1 | 48.9 | 51.1 | 0.0 | 1004 | 2.76 | 399 | 55.0 | 1.00 |
| 2 | 48.8 | 50.6 | 0.6 | 1007 | 3.10 | | 61.7 | 1.12 |
| 3 | 48.7 | 49.4 | 1.9 | 946 | 2.89 | 379 | 61.2 | 1.11 |
| 4 | 47.5 | 48.8 | 3.7 | 843 | 2.45 | | 58.2 | 1.06 |
| 5 | 46.4 | 47.5 | 6.2 | 750 | 2.07 | 319 | 55.3 | 1.01 |
| 6 | 44.9 | 46.2 | 8.9 | 630 | 1.75 | | 55.7 | 1.01 |
| 7 | 43.1 | 45.0 | 11.9 | 577 | 1.46 | 307 | 50.8 | 0.92 |
| 8 | 41.9 | 43.0 | 15.1 | 472 | 1.20 | 247 | 50.7 | 0.92 |
| 9 | 39.8 | 42.0 | 18.2 | 449 | 1.08 | | 47.9 | 0.87 |
| Table 1 (continued): compositions and evaluation results for the FePtRu magnetic recording layers of Example 1 (Fe/Pt = approximately 1.1) | | | | | | | | |
| 10 | 53.2 | 46.8 | 0.0 | 1044 | 3.08 | 470 | 59.0 | 1.00 |
| 11 | 53.2 | 46.2 | 0.6 | 1038 | 3.39 | | 65.2 | 1.11 |

TABLE 1-continued

Table 1 (continued): compositions and evaluation results for the
FePtRu magnetic recording layers of Example 1 (Fe/Pt = approximately 0.8)

| sample | composition proportions (at %) | | | Ms[*1] (emu/cc) | Ku[*2] (×10^7 erg/cc) | Tc (° C.) | Hk[*3] (kOe) | normalized Hk |
|---|---|---|---|---|---|---|---|---|
| | Fe | Pt | Ru | | | | | |
| 12 | 52.7 | 45.4 | 1.9 | 946 | 2.91 | 393 | 61.6 | 1.04 |
| 13 | 51.2 | 45.1 | 3.7 | 848 | 2.52 | | 59.4 | 1.01 |
| 14 | 50.1 | 43.7 | 6.1 | 726 | 2.11 | 365 | 58.3 | 0.99 |
| 15 | 48.5 | 42.9 | 8.6 | 673 | 2.05 | 382 | 60.9 | 1.03 |
| 16 | 46.9 | 41.5 | 11.6 | 599 | 1.70 | 272 | 56.8 | 0.96 |
| 17 | 45.6 | 39.5 | 14.9 | 499 | 1.36 | 315 | 54.5 | 0.92 |
| 18 | 43.7 | 38.7 | 17.6 | 330 | 0.854 | | 51.7 | 0.88 |
| 19 | 45.5 | 54.5 | 0.0 | 895 | 2.11 | 392 | 47.2 | 1.00 |
| 20 | 44.9 | 53.1 | 2.0 | 850 | 2.09 | 341 | 49.2 | 1.04 |
| 21 | 42.8 | 50.9 | 6.3 | 641 | 1.38 | 270 | 43.1 | 0.91 |
| 22 | 41.8 | 49.4 | 8.8 | 564 | 1.13 | 226 | 40.1 | 0.85 |
| 23 | 40.0 | 48.2 | 11.9 | 453 | 0.891 | 199 | 39.3 | 0.83 |

[*1] 1 emu/cc = 1 A/mm
[*2] 10^7 erg/cc = J/cm^3
[*3] 1 kOe = 79.6 A/mm

TABLE 2

Table 2: compositions and evaluation results for the FePtCu magnetic recording layers of Comparative Example 1

| sample | composition proportions (at %) | | | Fe/Pt ratio | Ms[*1] (emu/cc) | Ku[*2] (×10^7 erg/cc) | Tc (° C.) | Hk[*3] (kOe) | normalized Hk |
|---|---|---|---|---|---|---|---|---|---|
| | Fe | Pt | Cu | | | | | | |
| C1 | 53.2 | 46.8 | 0.0 | approximately 1.2 | 1044 | 3.08 | 470 | 59.0 | 1.00 |
| C2 | 53.0 | 46.3 | 0.7 | | 1032 | 3.10 | | 60.1 | 1.02 |
| C3 | 52.6 | 45.6 | 1.8 | | 985 | 2.78 | | 56.5 | 0.96 |
| C4 | 51.9 | 44.2 | 3.9 | | 973 | 2.62 | 408 | 53.8 | 0.91 |
| C5 | 49.1 | 41.4 | 9.5 | | 949 | 2.05 | 375 | 43.2 | 0.73 |
| C6 | 46.0 | 38.7 | 15.3 | | 853 | 1.40 | 342 | 32.8 | 0.56 |
| C7 | 43.3 | 35.5 | 21.2 | | 774 | 1.12 | 317 | 28.8 | 0.49 |
| C8 | 36.9 | 29.5 | 33.6 | | 634 | 0.662 | 288 | 20.9 | 0.35 |
| C9 | 45.3 | 50.3 | 4.4 | approximately 0.9 | 888 | 2.17 | 382 | 48.9 | |
| C10 | 42.5 | 46.3 | 11.2 | | 817 | 1.61 | 338 | 39.4 | |
| C11 | 38.8 | 41.8 | 19.4 | | 695 | 0.961 | 276 | 27.7 | |
| C12 | 39.7 | 57.5 | 2.9 | approximately 0.7 | 752 | 1.04 | 283 | 27.7 | |
| C13 | 38.3 | 54.7 | 7.0 | | 705 | 1.04 | 291 | 29.5 | |

[*1] 1 emu/cc = 1 A/mm
[*2] 10^7 erg/cc = J/cm^3
[*3] 1 kOe = 79.6 A/mm

TABLE 3

Table 3: compositions and evaluation results for the FePtV magnetic recording layers of Comparative Exampe 2

| sample | composition proportions (at %) | | | Fe/Pt ratio | Ms[*1] (emu/cc) | Ku[*2] (×10^7 erg/cc) | Tc (° C.) | Hk[*3] (kOe) | normalized Hk |
|---|---|---|---|---|---|---|---|---|---|
| | Fe | Pt | V | | | | | | |
| C14 | 49.5 | 50.5 | 0 | approximately 1.0 | 982 | 3.00 | 414 | 61.0 | 1.00 |
| C15 | 48.8 | 48.9 | 2.3 | | 917 | 2.67 | | 58.3 | 0.95 |
| C16 | 48.1 | 47.8 | 4.1 | | 889 | 2.27 | 411 | 51.0 | 0.84 |
| C17 | 46.8 | 46.7 | 6.4 | | 838 | 1.70 | | 40.6 | 0.67 |
| C18 | 45.4 | 45.8 | 8.8 | | 769 | 1.28 | 404 | 33.4 | 0.55 |
| C19 | 44.2 | 44.1 | 11.7 | | 683 | 0.789 | | 23.1 | 0.38 |
| C20 | 42.9 | 42.5 | 14.6 | | 633 | 0.376 | 358 | 11.9 | 0.19 |
| C21 | 41.6 | 41.3 | 17.0 | | 544 | 0.237 | | 8.7 | 0.14 |
| C22 | 40.7 | 40.0 | 19.3 | | 465 | 0.262 | 312 | 11.3 | 0.18 |
| C23 | 53.2 | 46.8 | 0.0 | approximately 1.1 | 1044 | 3.08 | 469 | 59.0 | 1.00 |

TABLE 3-continued

Table 3: compositions and evaluation results for the FePtV magnetic recording layers of Comparative Exampe 2

| sample | composition proportions (at %) Fe | Pt | V | Fe/Pt ratio | Ms*1 (emu/cc) | Ku*2 (×10^7 erg/cc) | Tc (° C.) | Hk*3 (kOe) | normalized Hk |
|---|---|---|---|---|---|---|---|---|---|
| C24 | 50.8 | 44.9 | 4.3 | | 920 | 2.01 | 403 | 43.7 | 0.74 |
| C25 | 48.4 | 42.9 | 8.7 | | 776 | 1.10 | 385 | 28.3 | 0.48 |
| C26 | 45.7 | 39.7 | 14.6 | | 618 | 0.517 | 363 | 16.7 | 0.28 |

*1 1 emu/cc = 1 A/mm
*2 10^7 erg/cc = J/cm^3
*3 1 kOe = 79.6 A/mm

TABLE 4

Table 4: compositions and evaluation results for the FePtMn magnetic recording layers of Comparative Example 3

| sample | composition proportions (at %) Fe | Pt | Mn | Fe/Pt ratio | Ms*1 (emu/cc) | Ku*2 (×10^7 erg/cc) | Tc (° C.) | Hk*3 (kOe) | normalized Hk |
|---|---|---|---|---|---|---|---|---|---|
| C27 | 53.2 | 46.8 | 0.0 | approximately 1.2 | 1044 | 3.08 | 470 | 59.0 | 1.00 |
| C29 | 53.7 | 45.5 | 0.8 | | 1006 | 2.92 | 433 | 58.0 | 0.98 |
| C30 | 53.7 | 44.5 | 1.8 | | 985 | 2.86 | 430 | 58.1 | 0.98 |
| C31 | 52.6 | 43.0 | 4.4 | | 930 | 2.33 | 395 | 50.1 | 0.85 |
| C32 | 52.0 | 42.5 | 5.5 | | 900 | 1.77 | | 39.3 | 0.67 |
| C33 | 50.5 | 41.4 | 8.0 | | 841 | 1.41 | | 33.6 | 0.57 |
| C34 | 48.9 | 40.3 | 10.8 | | 737 | 1.12 | 380 | 30.3 | 0.51 |
| C35 | 46.3 | 38.4 | 15.3 | | 585 | 0.413 | | 14.1 | 0.24 |
| C36 | 44.6 | 37.2 | 18.3 | | 544 | 0.297 | 301 | 10.9 | 0.18 |
| C37 | 41.4 | 33.7 | 24.9 | | 405 | 0.137 | 262 | 6.8 | 0.11 |
| C38 | 53.2 | 46.8 | 0.0 | approximately 1.1 | 1044 | 3.08 | 470 | 59.0 | 1.00 |
| C39 | 53.0 | 42.6 | 4.4 | | 930 | 2.13 | 395 | 45.8 | 0.78 |
| C40 | 48.6 | 40.6 | 10.8 | | 737 | 1.12 | 380 | 30.3 | 0.51 |
| C41 | 44.7 | 37.1 | 18.3 | | 544 | 0.297 | 301 | 10.9 | 0.18 |
| C42 | 48.9 | 51.1 | 0.0 | approximately 1.0 | 1004 | 2.76 | 414 | 55.0 | 1.00 |
| C43 | 45.8 | 49.9 | 4.3 | | 842 | 2.03 | 368 | 48.2 | 0.88 |
| C44 | 43.6 | 46.6 | 9.8 | | 751 | 1.61 | 346 | 42.8 | 0.78 |
| C45 | 41.6 | 42.4 | 16.0 | | 538 | 0.67 | 315 | 24.9 | 0.45 |

*1 1 emu/cc = 1 A/mm
*2 10^7 erg/cc = J/cm^3
*3 1 kOe = 79.6 A/mm

Figure 3:
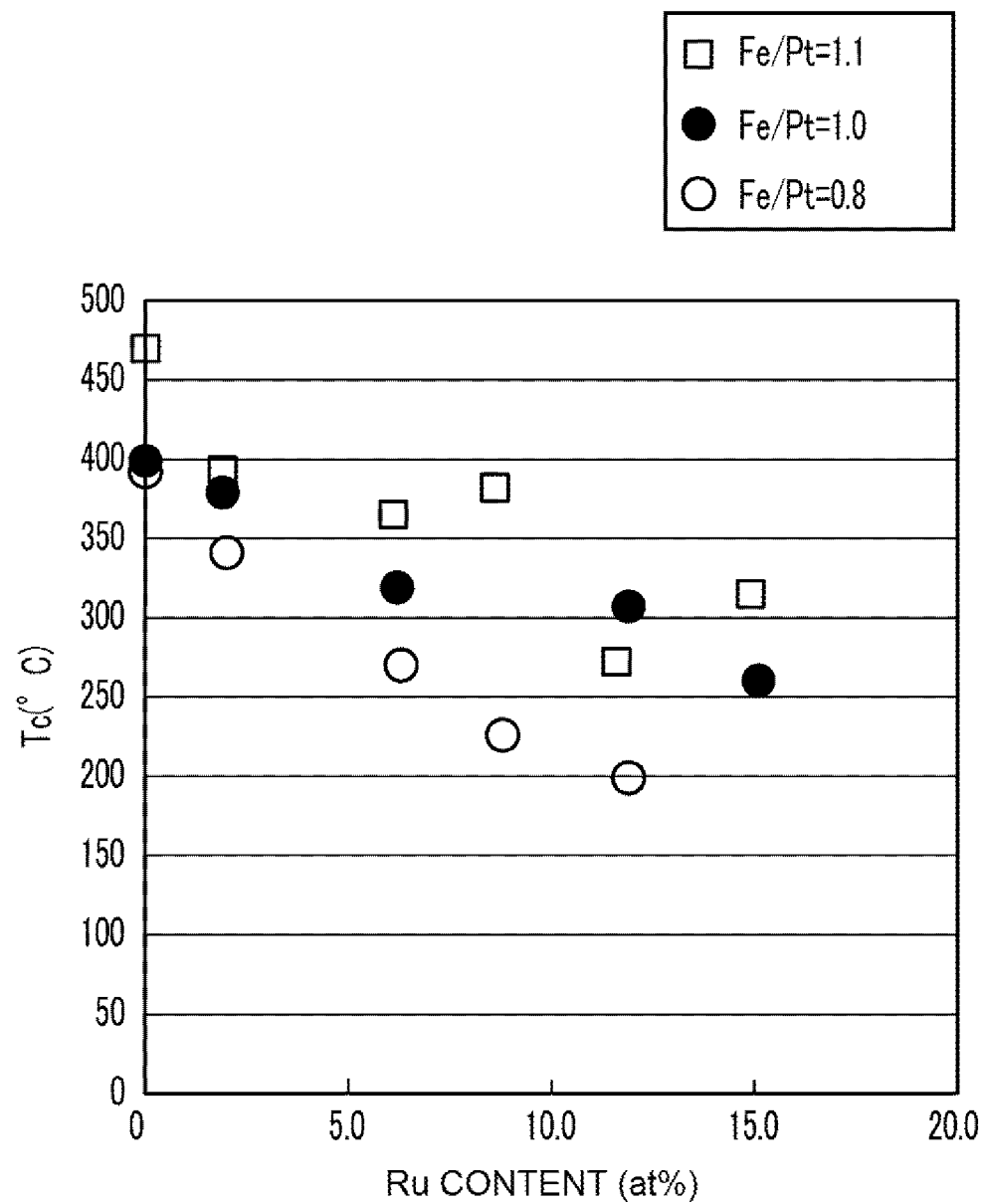
FIG. 3 is a graph that shows the relationship between the amount of Ru addition and the Curie temperature Tc for the magnetic recording medium of Example 1.

The relationship between the Ru content and the Curie temperature Tc for the magnetic recording layers 30 obtained in Example 1 is shown in FIG. 3. FIG. 3 demonstrates that the Curie temperature Tc declines as the Ru content increases for magnetic recording layers 30 having the same Fe/Pt ratio.

Figure 4:
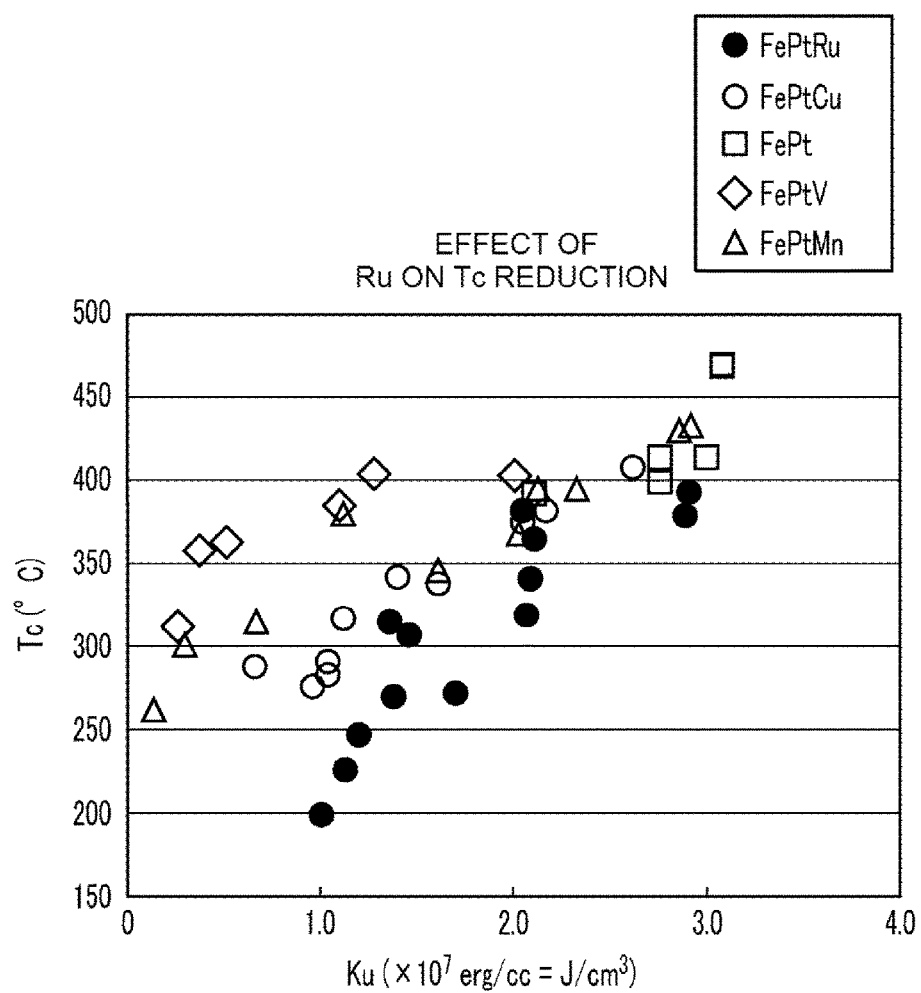
FIG. 4 is a graph that shows the relationship between the magnetic anisotropy constant Ku and the Curie temperature Tc for the magnetic recording media of Example 1 and Comparative Examples 1 to 3.

The relationship between the magnetic anisotropy constant Ku and the Curie temperature Tc for the magnetic recording layers 30 obtained in Example 1 and Comparative Examples 1 to 3 is shown in FIG. 4. In FIG. 4, the plots of samples 1, 10, and 19 of Example 1 (unfilled squares), which had a magnetic recording layer 30 that did not contain Ru, are distinguished from the plots of samples 2-9, 11-18, and 20-23 of Example 1 (filled circles), which had an Ru-containing magnetic recording layer 30. As shown in FIG. 4, at a given magnetic anisotropy constant Ku, a magnetic recording layer 30 formed from FePtRu has a lower Curie temperature Tc than a magnetic recording layer 30 formed from FePt or FePtX (X=Cu, V or Mn). In particular, the amount of reduction in the Curie temperature Tc is lower for the use of V or Mn as X than for the use of Cu as X. It is shown that V and Mn are not effective with respect to the object of lowering the Curie temperature Tc while maintaining the magnetic anisotropy constant Ku. Conversely, at a given Curie temperature Tc, a magnetic recording layer 30 formed from FePtRu has a larger magnetic anisotropy constant Ku than a magnetic recording layer 30 formed from FePtX. These results show that FePtRu can bring about a lowering of the Curing temperature Tc while maintaining a large magnetic anisotropy constant Ku. A material that has a large magnetic anisotropy constant Ku is energetically stable in the direction of the magnetization easy axis. For magnetic recording media that have a magnetic recording layer, a magnetic recording layer formed from a material having a large magnetic anisotropy constant Ku provides a high thermal stability for the written magnetization (signal).

Figure 5:
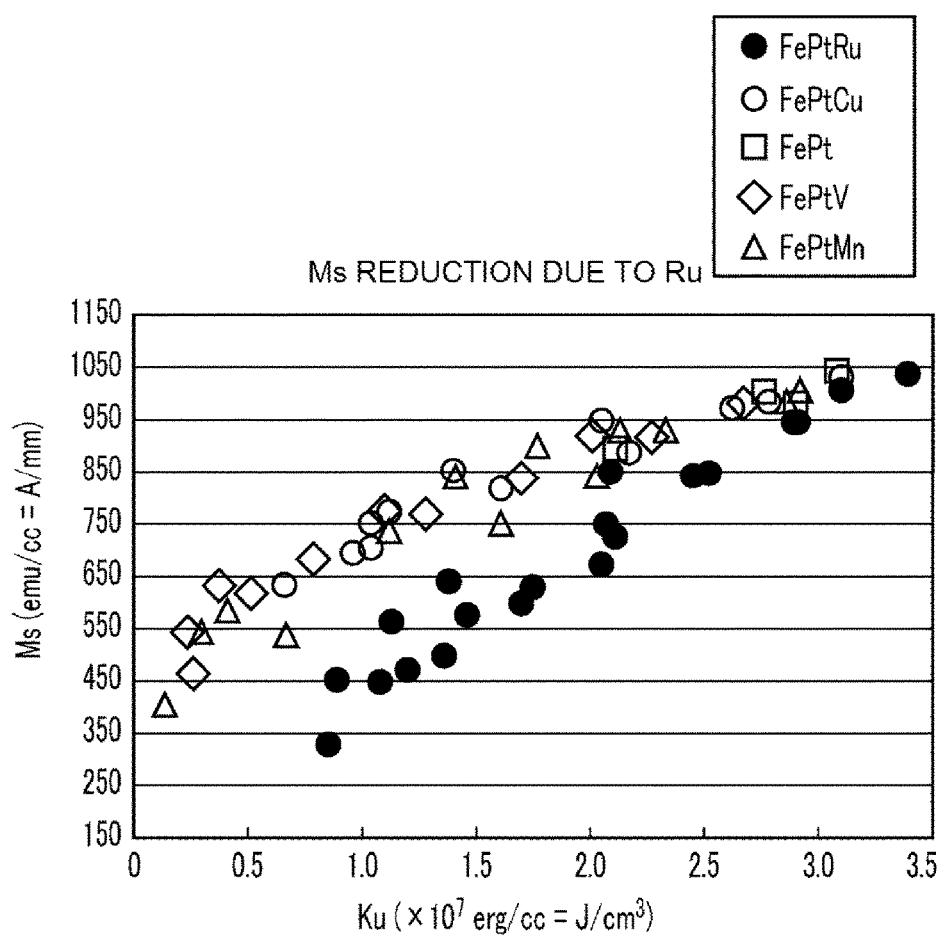
FIG. 5 is a graph that shows the relationship between the magnetic anisotropy constant Ku and the saturation magnetization Ms for the magnetic recording media of Example 1 and Comparative Examples 1 to 3.

The relationship between the magnetic anisotropy constant Ku and the saturation magnetization Ms for the magnetic recording layers 30 obtained in Example 1 and Comparative Examples 1 to 3 is shown in FIG. 5. Also in FIG. 5, the plots of samples 1, 10, and 19 of Example 1 (unfilled squares), which had a magnetic recording layer 30 that did not contain Ru, are distinguished from the plots of samples 2-9, 11-18, and 20-23 of Example 1 (filled circles), which had an Ru-containing magnetic recording layer 30. As shown in FIG. 5, at a given magnetic anisotropy constant Ku, a magnetic recording layer 30 formed from FePtRu has a smaller saturation magnetization Ms versus magnetic recording layers formed from FePt or FePtX (X=Cu, V, or Mn), which have similar saturation magnetizations Ms. These results show that, for a magnetic recording medium having a magnetic recording layer 30 formed of FePtRu, the Ru added to the ordered alloy exhibits an action completely different from that of Cu, Mn, and V. For example, it is hypothesized that a phenomenon analogous to anti-ferromagnetic coupling, which produces couples with opposite spin directions, is produced via the added Ru.

Figure 6:
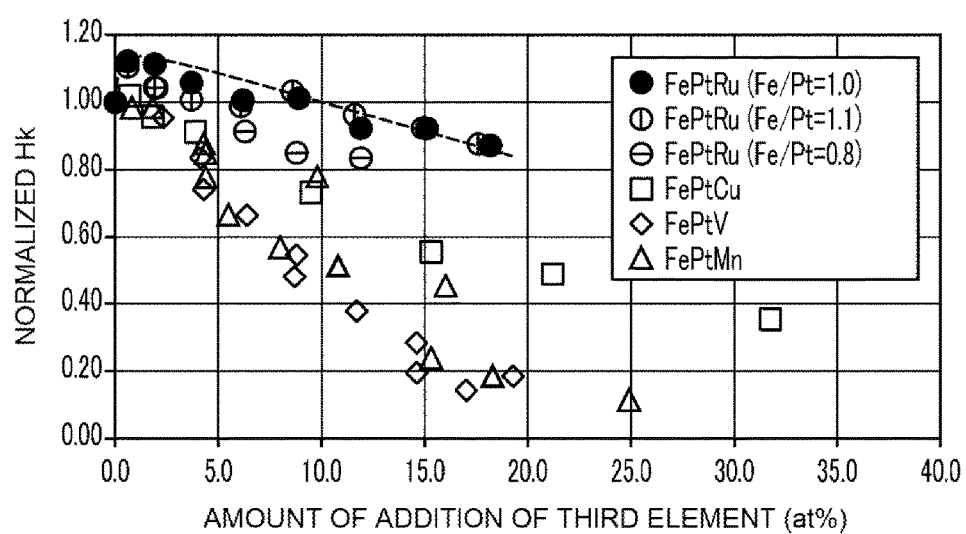
FIG. 6 is a graph that shows the relationship, for the magnetic recording media of Example 1 and Comparative Examples 1 to 3, between the amount of addition of the third element and the normalized Hk.

FIG. 6 shows the relationship between the amount of addition of the third element and the normalized Hk for the magnetic recording layers 30 obtained in Example 1 and Comparative Examples 1 to 3. As shown in FIG. 6, the normalized Hk undergoes a sharp decline as the amount of addition increases when ordered alloys containing Cu, Mn, or V are used. On the other hand, the normalized Hk undergoes a small decline when an Ru-containing ordered alloy is used. In actuality a normalized Hk of at least 0.8 is maintained in the region of an amount of Ru addition of not more than 20 at %. Moreover, the normalized Hk presents a value of 1.0 or more in the region of an amount of Ru addition of not more than 10 at %. This means that the anisotropic magnetic field Hk was increased by the addition of Ru. These results demonstrate that the Ru added to the ordered alloy exhibits an action completely different from that of Cu, Mn, and V.

The preceding results demonstrate that a magnetic recording medium having a magnetic recording layer 30 formed from FePtRu makes it possible to reduce the heating temperature during writing and to maintain the stability of the written signal.

Example 2

A nonmagnetic substrate 10 was prepared by cleaning a (001) MgO single-crystal substrate that had a smooth, flat surface. After cleaning, the nonmagnetic substrate 10 was introduced into a sputtering apparatus.

After the nonmagnetic substrate 10 had been heated to 430° C., an FePt—C first magnetic layer 31 having a granular structure and a film thickness of 2 nm was formed by DC magnetron sputtering in Ar gas at a pressure of 1.5 Pa using an FePt target and a C target. The power applied to the FePt target was 40 W, and the power applied to the C target was 232 W. The Fe content and Pt content in the magnetic crystal grains in the resulting first magnetic layer 31 was 49 at % and 51 at %, respectively, with reference to the total number of atoms in the magnetic crystal grains. The content of the C constituting the nonmagnetic grain boundary was 40 volume % with reference to the volume of the first magnetic layer 31.

The nonmagnetic substrate 10 bearing the first magnetic layer 31 was then heated to 430° C. and a magnetic recording layer 30 formed of the first magnetic layer 31 and a second magnetic layer 32 was obtained by forming an FePtRu—BC second magnetic layer 32 having a granular structure by magnetron sputtering in an Ar gas at a pressure of 1.5 Pa using an FePt target, Ru target, B target, and C target. The DC power applied to the FePt target was 40 W; the DC power applied to the Ru target was 30 W; the RF power applied to the B target was 220 W; and the DC power applied to the C target was 47 W. The contents of the Fe, Pt, and Ru in the magnetic crystal grains of the resulting second magnetic layer 32 were 44 at %, 45 at %, and 11 at %, respectively, with reference to the total number of atoms in the magnetic crystal grains. The contents of the B and C constituting the nonmagnetic grain boundary were 15 volume % and 5 volume %, respectively, with reference to the volume of the second magnetic layer 32. Second magnetic layers 32 having film thicknesses of 3 nm, 5 nm, and 7 nm were formed by adjusting the production time for the second magnetic layer 32.

Figure 2:
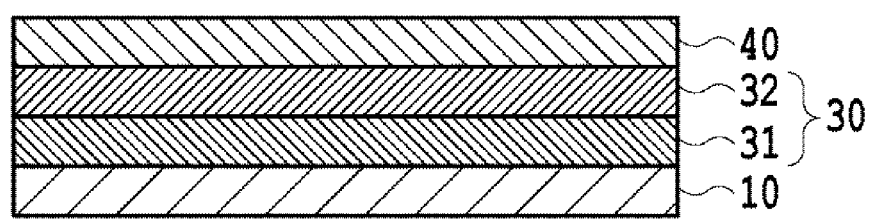
FIG. 2 is a cross-sectional diagram that shows a structural example for the magnetic recording medium of a second embodiment.

Then, after the nonmagnetic substrate 10 bearing the magnetic recording layer 30 had been cooled to 25° C., a Pt protective layer 40 with a film thickness of 5 nm was formed by DC magnetron sputtering in Ar gas at a pressure of 0.5 Pa using a Pt target, thus yielding a magnetic recording medium having the structure shown in FIG. 2.

The saturation magnetization Ms and magnetic anisotropy constant Ku of the resulting magnetic recording layers 30 were measured using the same procedure as in Example 1. The magnetic anisotropy constant Ku is measured here as the energy value per the total volume of the magnetic crystal grains and nonmagnetic grain boundary. The net magnetic anisotropy constant, "Ku_grain", for the magnetic crystal grains was therefore calculated. The net magnetic anisotropy constant Ku_grain was obtained by dividing the measured magnetic anisotropy constant Ku by the volume ratio for the magnetic crystal grains in the magnetic recording layer 30. The compositions of the magnetic recording layers and the results of the measurements are given in Table 5.

Using analysis by electron energy loss spectroscopy (EELS) attached to a transmission electron microscope (TEM), compositional analysis was carried out at the same time as observation of the grain structure for the magnetic recording layer of sample 26. It was confirmed as a result that the Ru was in solid solution within the FePt grains and that Ru was not present at the grain boundary region.

Example 3

Magnetic recording media were obtained by repeating the procedure in Example 2, but in this case changing the amount of Ru addition by adjusting the power applied to each of the targets during formation of the second magnetic layer 32. The contents of the Fe, Pt, and Ru in the magnetic crystal grains of the resulting second magnetic layers 32 of this example were 46 at %, 48 at %, and 6 at %, respectively, with reference to the total number of atoms in the magnetic crystal grains.

The saturation magnetization Ms and magnetic anisotropy constant Ku were measured on the obtained magnetic recording layers using the same procedures as in Example 2 and the net magnetic anisotropy constant Ku_grain was calculated for the magnetic crystal grains. The compositions of the magnetic recording layers and the results of the measurements are given in Table 5.

Example 4

Magnetic recording media were obtained by repeating the procedure of Example 2, with the exception that the material for the nonmagnetic grain boundary of the second magnetic layer 32 was changed to $SiO_2$. An $SiO_2$ target was used in place of the B target and C target during formation of the second magnetic layer 32 in this example.

By adjusting the power applied to the individual targets, the contents of the Fe, Pt, and Ru in the magnetic crystal grains of the second magnetic layer 32 were brought to 46 at %, 48 at %, and 6 at %, respectively, with reference to the total number of atoms in the magnetic crystal grains. The content of the $SiO_2$ constituting the nonmagnetic grain boundary was 35 volume % with reference to the volume of the second magnetic layer 32.

The saturation magnetization Ms and magnetic anisotropy constant Ku were measured on the obtained magnetic recording layers using the same procedures as in Example 2 and the net magnetic anisotropy constant Ku_grain was calculated for the magnetic crystal grains. The compositions of the magnetic recording layers and the results of the measurements are given in Table 5.

TABLE 5

Table 5: Compositions of the magnetic recording layers and evaluation results for Examples 2 to 4 and Comparative Example 2

| | | magnetic recording layer | | | | | | | | | |
|---|---|---|---|---|---|---|---|---|---|---|---|
| | | second magnetic layer | | | | | | | | | |
| | | magnetic crystal grains | | | | nonmagnetic grain boundary | | | | overall | |
| | sample | Fe (at %) | Pt (at %) | Ru (at %) | Mn (at %) | B (vol %) | C (vol %) | $SiO_2$ (vol %) | film thickness (nm) | film thickness (nm) | Ms*[1] (emu/cc) | Ku_grain*[2] (×$10^7$ erg/cc) |
| Example 2 | 24 | 44 | 45 | 11 | — | 15 | 5 | — | 3 | 5 | 524 | 1.35 |
| | 25 | 44 | 45 | 11 | — | 15 | 5 | — | 5 | 7 | 509 | 1.23 |
| | 26 | 44 | 45 | 11 | — | 15 | 5 | — | 7 | 9 | 502 | 1.35 |
| Example 3 | 27 | 46 | 48 | 6 | — | 15 | 5 | — | 3 | 5 | 688 | 2.46 |
| | 28 | 46 | 48 | 6 | — | 15 | 5 | — | 5 | 7 | 670 | 1.93 |
| | 29 | 46 | 48 | 6 | — | 15 | 5 | — | 7 | 9 | 642 | 1.86 |
| Example 4 | 30 | 46 | 48 | 6 | — | — | — | 35 | 3 | 5 | 630 | 2.10 |
| | 31 | 46 | 48 | 6 | | | | 35 | 5 | 7 | 550 | 1.26 |
| | 32 | 46 | 48 | 6 | | | | 35 | 7 | 9 | 537 | 0.802 |
| Comparative Example 4 | C46 | 39 | 50 | — | 11 | 15 | 5 | — | 3 | 5 | 454 | 0.814 |
| | C47 | 39 | 50 | — | 11 | 15 | 5 | — | 5 | 7 | 423 | 0.188 |
| | C48 | 39 | 50 | — | 11 | 15 | 5 | — | 7 | 9 | 407 | 0.524 |

*[1] 1 emu/cc = 1 A/mm
*[2] $10^7$ erg/cc = 1 J/cm³ and the net magnetic anisotropy constant Ku_grain was calculated for the magnetic crystal grains. The compositions of the magnetic recording layers and the results of the measurements are given in Table 5.

Comparative Example 4

Magnetic recording media were obtained by repeating the procedure of Example 2, with the exception that the third element of the magnetic crystal grains in the second magnetic layer 32 was changed to Mn. An Mn target was used in place of the Ru target during formation of the second magnetic layer 32 in this example.

By adjusting the power applied to the individual targets during the formation of the second magnetic layer 32, the contents of the Fe, Pt, and Mn in the magnetic crystal grains of the second magnetic layer 32 were brought to 39 at %, 50 at %, and 11 at %, respectively, with reference to the total number of atoms in the magnetic crystal grains. The contents of the B and C constituting the nonmagnetic grain boundary were 15 volume % and 5 volume %, respectively, with reference to the volume of the second magnetic layer 32. Second magnetic layers 32 with a film thickness of 3 nm, 5 nm, or 7 nm were formed by adjusting the production time for the second magnetic layer 32.

Table 5 demonstrates that a large net magnetic anisotropy constant Ku_grain and a large saturation magnetization Ms are exhibited by the magnetic recording media in Examples 2 and 3, which have a magnetic recording layer constituted of an FePt—C first magnetic layer 31 and an FePtRu—BC second magnetic layer 32, and by the magnetic recording medium of Example 4, which has an FePt—C first magnetic layer 31 and an FePtRu—$SiO_2$ second magnetic layer 32. On the other hand, a significant decline in the saturation magnetization Ms and the net magnetic anisotropy constant Ku_grain were observed for the magnetic recording media of Comparative Example 4, which contained an FePtMn—BC second magnetic layer 32 that had no Ru as the third element. The preceding demonstrates that the magnetic recording media of these examples can realize both a high thermal stability for the written magnetization (signal) as well as a high signal output.

Moreover, it is shown that, at the same film thickness for the second magnetic layer, the magnetic recording media of Example 3, in which the nonmagnetic grain boundary is formed by a mixture of boron (B) and carbon (C), exhibit a net magnetic anisotropy constant Ku_grain and a saturation magnetization Ms that are larger than for the magnetic recording media of Example 4, in which the nonmagnetic grain boundary is formed of silicon dioxide ($SiO_2$).

Example 5

A nonmagnetic substrate was prepared by cleaning a (001) MgO single-crystal substrate that had a smooth, flat surface. After cleaning, the nonmagnetic substrate was introduced into a sputtering apparatus.

After the nonmagnetic substrate had been heated to 430° C., an FePt—C first magnetic layer having a granular structure and a film thickness of 2 nm was formed by DC magnetron sputtering in Ar gas at a pressure of 1.5 Pa using an FePt target and a C target. The power applied to the FePt target was 50 W, and the power applied to the C target was 345 W. The Fe and Pt contents in the magnetic crystal grains in the resulting first magnetic layer were 50 at % and 50 at %, respectively, with reference to the total number of atoms in the magnetic crystal grains. The content of the C constituting the nonmagnetic grain boundary was 40 volume % with reference to the volume of the first magnetic layer.

The nonmagnetic substrate bearing the first magnetic layer was then heated to 430° C. and a magnetic recording layer formed of a first magnetic layer and a second magnetic layer was obtained by forming an FePtRu—BC second magnetic layer having a granular structure and a film thickness of 7 nm by magnetron sputtering in Ar gas at a pressure of 1.5 Pa using an FePt target, Ru target, B target, and C target. The DC power applied to the FePt target was 50 W; the DC power applied to the Ru target was 1 W; the RF power applied to the B target was 349 W; and the DC power applied to the C target was 59 W. The contents of the Fe, Pt, and Ru in the magnetic crystal grains of the resulting second magnetic layer were 47 at %, 47 at %, and 6 at %, respectively, with reference to the total number of atoms in the magnetic crystal grains. The contents of the B and C constituting the nonmagnetic grain boundary were 15 volume % and 5 volume %, respectively, with reference to the volume of the second magnetic layer.

Then, after the nonmagnetic substrate bearing the magnetic recording layer had been cooled to 25° C., a Pt protective layer with a film thickness of 5 nm was formed by DC magnetron sputtering in Ar gas at a pressure of 0.5 Pa using a Pt target, thus yielding a magnetic recording medium.

The saturation magnetization Ms and magnetic anisotropy constant Ku of the resulting magnetic recording layer were measured using the same procedures as in Example 1. The magnetic anisotropy constant Ku is measured here as the energy value per the total volume of the magnetic crystal grains and nonmagnetic grain boundary. The net magnetic anisotropy constant Ku_grain for the magnetic crystal grains was therefore calculated. The net magnetic anisotropy constant Ku_grain was obtained by dividing the measured magnetic anisotropy constant Ku by the volume ratio for the magnetic crystal grains in the magnetic recording layer. The results of the measurements are given in Table 6.

Example 6

A nonmagnetic substrate was prepared as described in Example 5. After cleaning, the nonmagnetic substrate was introduced into a sputtering apparatus.

After the nonmagnetic substrate had been heated to 430° C., an FePtRu—C first magnetic layer 31 having a granular structure and a film thickness of 2 nm was formed by DC magnetron sputtering in Ar gas at a pressure of 1.5 Pa using an FePt target, an Ru target, and a C target. The power applied to the FePt target was 50 W; the power applied to the Ru target was 1 W; and the power applied to the C target was 350 W. The contents of the Fe, Pt, and Ru in the magnetic crystal grains in the resulting first magnetic layer were 47 at %, 47 at %, and 6 at %, respectively, with reference to the total number of atoms in the magnetic crystal grains. The content of the C constituting the nonmagnetic grain boundary was 40 volume % with reference to the volume of the first magnetic layer.

A second magnetic layer and a protective layer were then formed using the same procedures as in Example 5 to obtain a magnetic recording medium. The saturation magnetization Ms and magnetic anisotropy constant Ku of the magnetic recording layer and the net magnetic anisotropy constant Ku_grain of the magnetic crystal grains were determined on the obtained magnetic recording medium. The results of the measurements are given in Table 6.

TABLE 6

Table 6: Results of the evaluations for Examples 5 and 6

| example | Ru content[1] first magnetic layer (at %) | Ru content[1] second magnetic layer (at %) | Ms[2] (emu/cc) | Ku[3] (×10$^7$ erg/cc) | Ku_grain[3] (×10$^7$ erg/cc) |
|---|---|---|---|---|---|
| 5 | 0 | 6 | 578 | 1.25 | 1.65 |
| 6 | 6 | 6 | 444 | 0.757 | 1.00 |

[1]percentage with reference to the total number of atoms in the magnetic crystal grains
[2]1 emu/cc = 1 A/mm
[3]10$^7$ erg/cc = J/cm$^3$ The magnetic recording medium of Example 5, which had Ru only in the second magnetic layer, had a large Ms, Ku, and Ku_grain just like the magnetic recording media of Examples 2 to 4. On the other hand, the magnetic recording medium of Example 6, which had Ru in both the first magnetic layer and the second magnetic layer, while presenting some decline in these numerical values still provided an acceptably large Ms, Ku, and Ku_grain. In particular, the net magnetic anisotropy constant Ku_grain of the magnetic crystal grains had a large value at 1.00 J/cm$^3$ (1.00×10$^7$ erg/cc). In addition, the magnetic recording media of Examples 5 and 6 had M-H hysteresis loops with excellent shapes.

What is claimed is:

1. A magnetic recording medium, comprising:
   a nonmagnetic substrate; and
   a magnetic recording layer that comprises a plurality of magnetic layers including:
   a first magnetic layer that is provided on the nonmagnetic substrate and that has a granular structure including magnetic crystal grains; and
   a second magnetic layer that is provided on the first magnetic layer, that has a granular structure including magnetic crystal grains, and that contains an ordered alloy comprised of:
   at least one element selected from the group consisting of Fe and Ni;
   at least one element selected from the group consisting of Pt, Pd, Au, Rh and Ir; and
   from 0.5 to 20 at % of Ru based on a total amount of the ordered alloy,
   wherein the first magnetic layer does not contain any ordered alloy.

2. The magnetic recording medium according to claim 1, wherein the ordered alloy is an L1$_0$-type ordered alloy containing Fe, Pt, and Ru.

3. The magnetic recording medium according to claim 1,
   wherein the first magnetic layer has a granular structure that includes magnetic crystal grains and a nonmagnetic grain boundary containing carbon; and
   wherein the second magnetic layer has a granular structure including magnetic crystal grains containing the ordered alloy and a nonmagnetic grain boundary containing at least one material selected from the group consisting of carbon, boron, carbides, oxides, and nitrides.

4. A magnetic recording medium, comprising:
a nonmagnetic substrate; and
a magnetic recording layer that comprises a plurality of magnetic layers including:
a first magnetic layer provided on the nonmagnetic substrate and having a granular structure that is provided with magnetic crystal grains and a nonmagnetic grain boundary containing carbon; and
a second magnetic layer formed on the first magnetic layer and having a granular structure that is provided with magnetic crystal grains formed from an ordered alloy comprising:
at least one element selected from the group consisting of Fe and Ni;
at least one element selected from the group consisting of Pt, Pd, Au, Rh and Ir; and
from 0.5 to 20 at % of Ru based on a total amount of the ordered alloy, and a nonmagnetic grain boundary containing carbon and boron,
wherein the magnetic crystal grains of the granular structure of first magnetic layer do not contain the ordered alloy.

5. A magnetic recording medium, comprising:
a nonmagnetic substrate; and
a magnetic recording layer that comprises a plurality of magnetic layers including:
a first magnetic layer that is provided on the nonmagnetic substrate and that has a granular structure including magnetic crystal grains; and
a second magnetic layer that is provided on the first magnetic layer, that has a granular structure including magnetic crystal grains, and that contains an ordered alloy comprised of:
Fe;
from 0.5 to 20 at % of Ru based on a total amount of the ordered alloy; and
at least one element selected from the group consisting of Pt, Pd, Au, Rh and Ir,
wherein the first magnetic layer does not contain any ordered alloy.

6. The magnetic recording medium according to claim 1, wherein the magnetic recording layer has a normalized anisotropic magnetic field that is 0.8 or greater.

7. The magnetic recording medium according to claim 1, wherein the ordered alloy comprises Fe, Pt, and from 0.5 to 20 atom % of Ru based on the total amount of the ordered alloy, and
wherein the magnetic recording layer has a normalized anisotropic magnetic field that is 0.8 or greater.

8. A method for heat assisted magnetic recording, comprising:
providing the magnetic recording medium according to claim 1; and
conducting heat assisted magnetic recording using the magnetic recording medium.

9. The magnetic recording medium according to claim 5, wherein the magnetic recording layer has a normalized anisotropic magnetic field that is 0.8 or greater.

10. The magnetic recording medium according to claim 5, wherein the ordered alloy comprises Fe, Pt, and from 0.5 to 20 atom % of Ru based on the total amount of the ordered alloy, and
wherein the magnetic recording layer has a normalized anisotropic magnetic field that is 0.8 or greater.

11. A method for heat assisted magnetic recording, comprising:
providing the magnetic recording medium according to claim 5; and
conducting heat assisted magnetic recording using the magnetic recording medium.

12. The magnetic recording medium according to claim 5, wherein the ordered alloy is an $L1_0$-type ordered alloy containing Fe, Pt, and Ru.

13. The magnetic recording medium according to claim 5, wherein the first magnetic layer has a granular structure that includes magnetic crystal grains and a nonmagnetic grain boundary containing carbon; and
wherein the second magnetic layer has a granular structure including magnetic crystal grains containing the ordered alloy and a nonmagnetic grain boundary containing at least one material selected from the group consisting of carbon, boron, carbides, oxides, and nitrides.

* * * * *